United States Patent Office 2,960,770
Patented Nov. 22, 1960

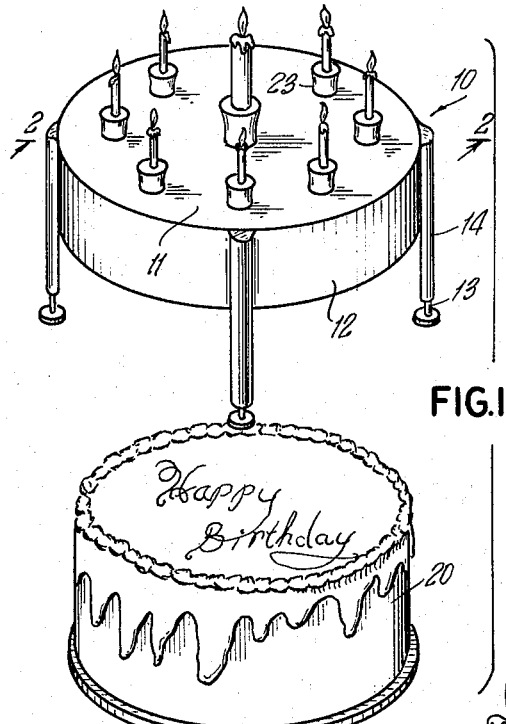
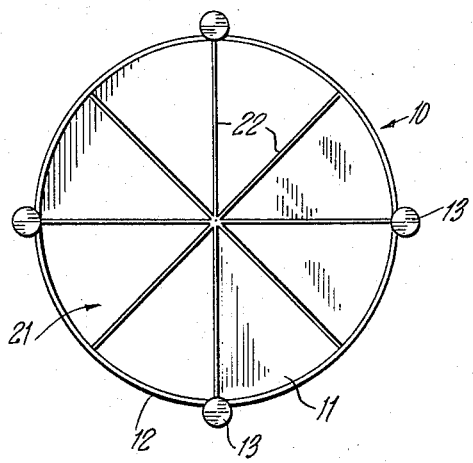
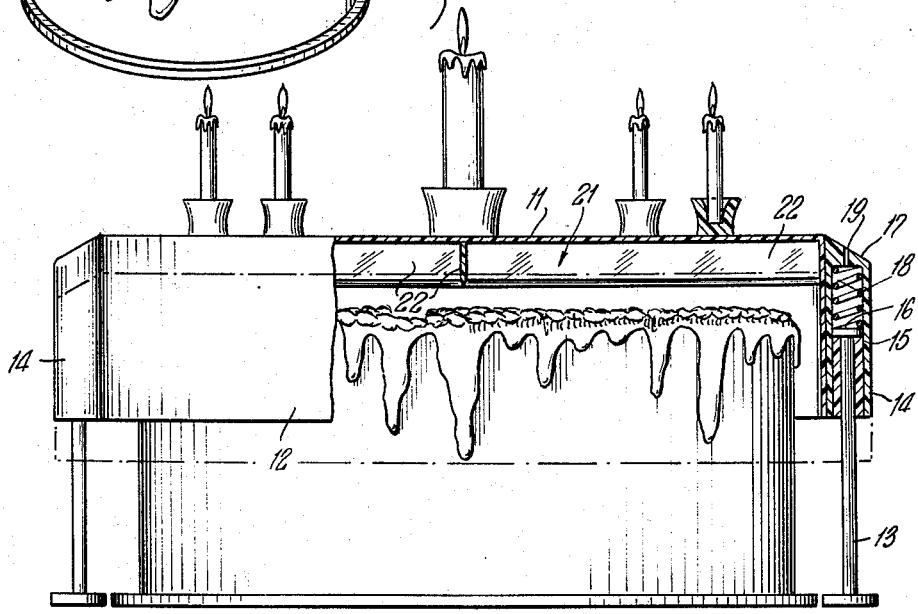

2,960,770

SANITARY MARKING DEVICE FOR TALL CAKES

Rudolph Valenta, 259 Linden Ave., Verona, N.J.

Filed May 26, 1958, Ser. No. 737,913

1 Claim. (Cl. 33—1)

This invention relates to sanitary protective means for birthday cakes. It is well known that in the common practice of a birthday celebrant's blowing out the candles on top of the cake, the breath carries onto the coating of the cake whatever contaminating germs are contained therein. Since the creamy coating of the cake generally provides an excellent culture medium for harmful germs, the health of the participants of the celebration is endangered when they eat of the cake. It is therefore an object of the present invention to provide a suitable protective cover for the cake so that, when the candles are blown out, the celebrant's breath does not come in contact with the cake.

Another object of the invention is the provision of such a protective cover which may be of the general shape of a hood or generally cylindrical cover having the contours of the cake, which may be made in various sizes according to the size of the cake. Further, provision is made for mounting candles on top of the hood in any desired number, with a single candle in the center preferably of larger dimensions than the remaining candles.

A further object of the invention is the provision on the underside of the roof of the protective hood, of blades or markers extending radially outward from the center and equidistantly spaced circumferentially, the number of such markers being equal to the desired number of pieces or sectors into which the cake is to be cut. Thus, when the hood is lowered so that the markers engage the top of the plate, and then removed, the lines down which the cake is to be cut into segments are clearly indicated on the cake.

A still further object of the invention is the provision of a protective sanitary birthday cake cover as stated above, with the additional improvement that the cover is supported on spring supported legs which normally urge the cover upward a short distance and support the roof above the cake top. Thus, upon depression of the cover against the force of the springs, the marking blades will engage the cake top and upon release of the cover the blades will rise clear of the top. Hence but a single light and quick depression of the cover will mark the cutting lines on the cake, and upon removal of the cover the cake will not be damaged.

The above as well as additional objects will be clarified in the following description wherein reference numerals refer to like-numbered parts in the accompanying drawing. It is to be noted that the drawing is intended solely for the purpose of illustration and that it is therefore neither desired nor intended to limit the invention necessarily to any or all of the exact details of construction shown or described except insofar as they may be deemed essential to the invention.

Referring briefly to the drawing, Fig. 1 is an exploded perspective view of a sanitary birthday cake protective cover embodying features of the present invention, together with a specimen birthday cake over which the cover is adapted to be positioned.

Fig. 2 is an enlarged view of the cover partly in front elevation and partly in section on the line 2—2 of Fig. 1.

Fig. 3 is a bottom plan view of the cover.

Referring in detail to the drawing, the numeral 10 indicates the cover which may be of any desired shape or conformation but which is preferably in the shape of a hood open at the bottom. The cover comprises the top or roof 11 and the surrounding cylindrical wall or apron 12.

To accommodate for legs 13 to support the cover, equidistantly circumferentially spaced vertical tubular housings 14 are formed or otherwise provided on the apron 12. Near their upper ends the inner walls of the housings 14 have shoulders 15. The legs 13 are in the form of rods or the like and have on their upper ends heads 16. Between the heads 16 and the upper closed ends 17 of the housings 14, springs 18 are mounted which normally urge the legs downward. Since the material of which the cover is made is of any suitable light weight material such as, for example, aluminum or plastic, the springs will thus normally support the cover above the tray or table level. Vents 19 are provided in the tops 17 of the housings 14. If a transparent plastic is used as the material, the cake, shown at 20, will be visible therethrough when the cover is positioned thereover. The depth of the apron 12 is a matter of choice.

On the underside of the roof 11, a radial arrangement of knife or cutter blades 21 is formed, preferably integral with the cover, the depth of the blades 22 being such that when the cover is positioned over the hood as shown in Fig. 2, the blades will be positioned above and clear of the top of the cake.

With the cake thus covered, the birthday celebrant blows out the candles contained in sockets 23, after which the cover is given a, so-to-speak, instantaneous push downward and release, whence the cover is removed and the top of the cake has the cutting marks impressed thereon.

As a consequence of the use of the cover in the manner stated, the participants of the celebration may freely partake of the cake without fear of swallowing germs contained in the breath of the person who blew out the candles.

Obviously modifications in form and structure may be made without departing from the spirit or scope of the invention.

The invention having thus been described, what is claimed and desired to be secured by Letters Patent, is as follows:

A marking device for tall cakes comprising a hood including a roof and a depending cylindrical apron, the underside of said roof having circumferentially equidistantly spaced radial blades extending downward therefrom a distance substantially smaller than the height of said apron, the apron having circumferentially spaced vertical tubular housings thereon of the same length as said apron on the outside of the apron, each of said housings including an upper portion and a lower portion, the upper end of the upper portion being closed except for a reduced vent therethrough, the internal diameter of said upper portion exceeding the internal diameter of said lower portion thereby providing a shoulder between said portions, a rod slidably mounted in said housing having a head on the upper end thereof registering in said upper portion thereby restricting said head to movement within the upper portion, the housing having a coiled compression spring mounted in said upper portion between said head and said upper end of the upper portion normally urging said head against said shoulder to extend the rod from the housing, the axial length of said upper portion of the housing slightly exceeding the depth of said blades.

References Cited in the file of this patent

UNITED STATES PATENTS

| | | |
|---|---|---|
| 850,022 | Lewis | Apr. 9, 1907 |
| 1,125,855 | Mapes | Jan. 19, 1915 |
| 1,453,367 | Schipplock et al. | May 1, 1923 |
| 1,519,752 | Bannister | Dec. 16, 1924 |
| 2,561,274 | Harrington | July 17, 1951 |
| 2,758,458 | Carlson | Aug. 14, 1956 |
| 2,825,588 | Lyon et al. | Feb. 25, 1958 |

FOREIGN PATENTS

| | | |
|---|---|---|
| 596,541 | Germany | May 8, 1934 |